Dec. 29, 1925.  
F. C. MOCK ET AL  
1,567,808  
FUEL SEPARATOR AND VAPORIZER  
Filed Oct. 24, 1921 5 Sheets-Sheet 1

Inventors  
Frank C. Mock  
Milton E. Chandler  
By Brown, Boettcher & Dienner  
Attorneys

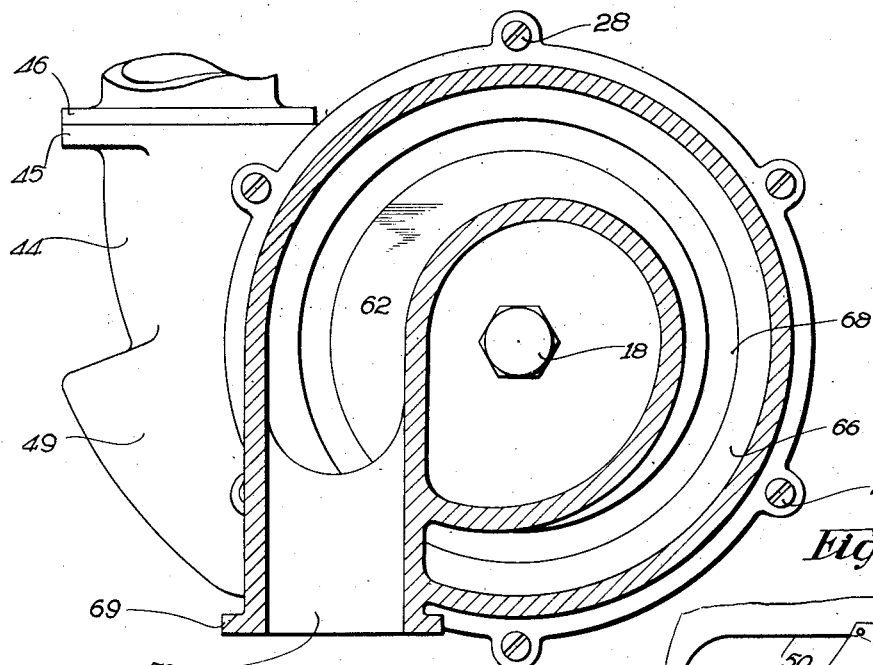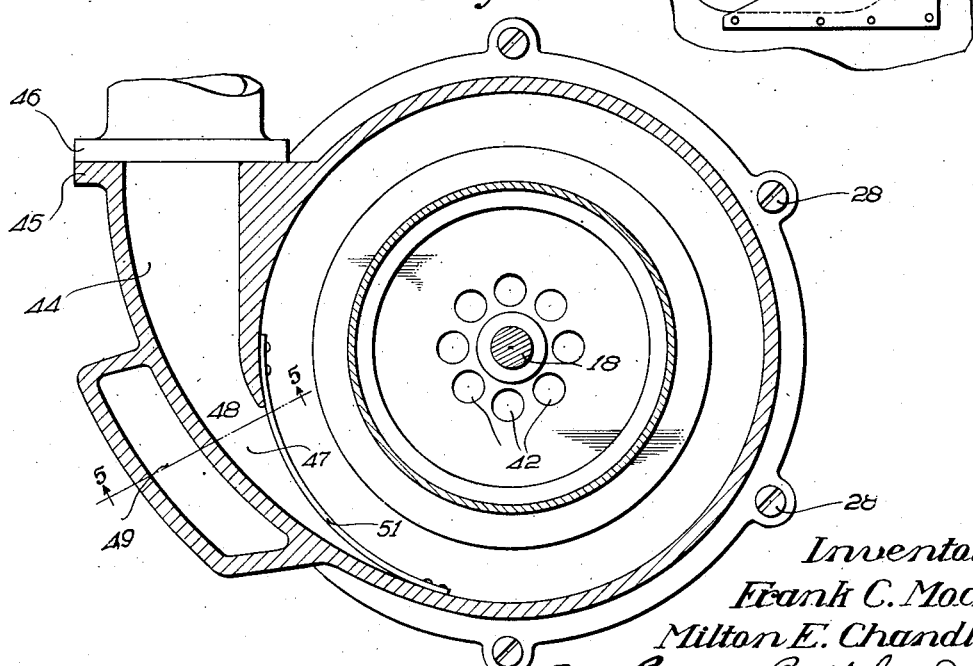

Inventors
Frank C. Mock
Milton E. Chandler
By Brown, Boettcher & Diemer
Attorneys Dec. 29, 1925.

F. C. MOCK ET AL

FUEL SEPARATOR AND VAPORIZER

Filed Oct. 24, 1921

Inventors
Frank C. Mock
Milton E. Chandler
By Brown, Boettcher & Dienner
Attorneys

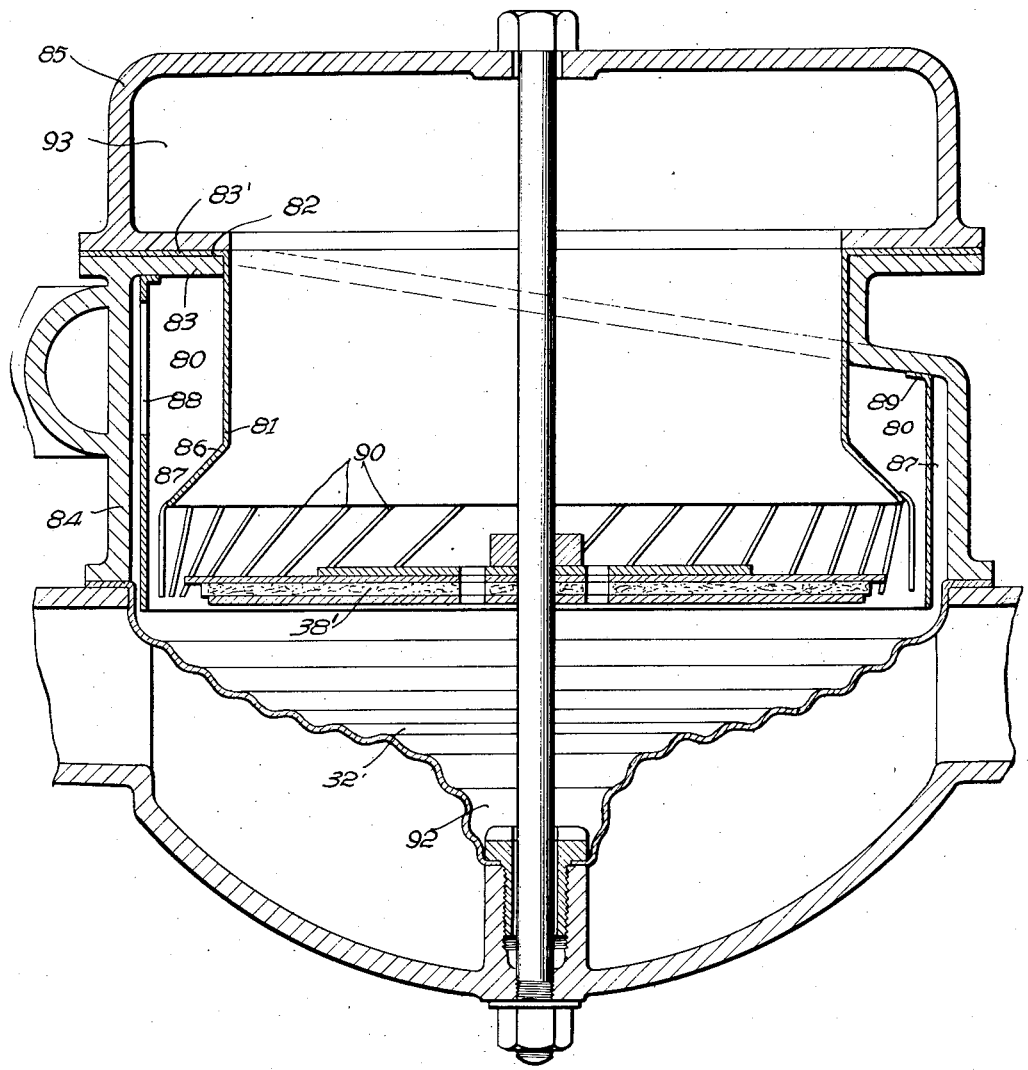

Patented Dec. 29, 1925.

1,567,808

UNITED STATES PATENT OFFICE.

FRANK C. MOCK AND MILTON E. CHANDLER, OF CHICAGO, ILLINOIS, ASSIGNORS TO STROMBERG MOTOR DEVICES COMPANY, OF CHICAGO, ILLINOIS, A CORPORATION OF ILLINOIS.

FUEL SEPARATOR AND VAPORIZER.

Application filed October 24, 1921. Serial No. 509,809.

*To all whom it may concern:*

Be it known that we, FRANK C. MOCK and MILTON E. CHANDLER, citizens of the United States, both residing at Chicago, in the county of Cook and State of Illinois, have invented a certain new and useful Improvement in Fuel Separators and Vaporizers, of which the following is a full, clear, concise, and exact description, reference being had to the accompanying drawings, forming a part of this specification.

The present invention relates to fuel separators and vaporizers for internal combustion engines.

Owing to the continued tendency of gasoline or other liquid fuels available for the operation of internal combustion engines to decrease in volatility, there is an urgent demand for fuel treating apparatus which will conveniently and economically utilize all of the fuel by volatilizing the fuel particles of low volatility or the "heavy ends" of the fuel as they are commonly called. The failure to volatilize and burn these heavy ends results in a detrimental crankcase oil dilution and premature wear in the engine bearings in addition to the well known starting and accelerating difficulties and loss of economy. The vaporization of these heavy ends by the application of heat has been the most successful solution advanced thus far. In the manner of applying this heat to the heavy ends of the fuel, however, numerous difficulties have been encountered. It has become evident from past development that heat application through the medium of the air component of the mixture is only a mild and inadequate method of heat application and very detrimental to the volumetric efficiency and power output of the engine. In addition to these disadvantages the high temperatures that are usually required to entirely vaporize the heavy ends in the ordinary gasoline involve excessive heating of the air, with consequent impairment of the lubricating function and overheating of the engine, and also cause preignition and deterioration. It has been recognized that the application of heat through the medium of the air component is not a method of sufficient heating intensity, (these heavy ends frequently having boiling temperatures approximating 450° F. or more) and accordingly recourse has been had to means for producing a more direct application of the heat to the fuel. In the development of this latter method it is first necessary that the air component of the mixture should not be subjected to the intensified heating along with the unvolatilized fuel; and second, that the heavy ends of the fuel should remain in association with the heating means for a sufficient time to vaporize the same. Inasmuch as the average interval embracing the vaporization, compression and expansion of one charge at intermediate engine speeds is approximately 1/25th second it will be apparent that the time required to vaporize the heavy ends of a charge is considerably longer than that available at this rate of operation. Consequently it is necessary to provide for delaying the passage of these heavy ends to the cylinder in order to supply sufficient heat for their vaporization. It is further desirable that the devices for accomplishing this end impose a minimum resistance to the flow of the mixture to the engine, otherwise they will decrease the volumetric efficiency and power output of the engine.

The general theory of operation of the related devices of the prior art is to draw the mixture into a separating chamber where it is set up in a vortex or involute whirl which throws out the heavier particles of fuel by centrifugal force. These heavier particles are treated according to various methods, being usually retained in contact or being recirculated into contact, with a heated surface until vaporized. The majority of these prior constructions have the disadvantage of heating the air component undesirably by reason of their action of circulating or moving the air in direct contact with the heating surface or in such relation as to receive the radiant heat therefrom. These prior devices are furthermore objectionable in that they impose considerable resistance to the flow of mixture, and thus result in a considerable reduction in the air density of the mixture flowing to the engine cylinder. This disadvantage is inherent in the manner in which the mixture is drawn from the separating chamber into the engine cylinder. The whirling motion to which the mixture is subjected in the involute or vortex chamber increases the density of the outer strata of mixture owing to the centrifugal force tending to expand the mixture outwardly against the outer wall, and this obviously decreases the density of the inner strata of mixture to a relatively low pressure. In these prior constructions the mixture is usually drawn from the center of the whirling chamber at the point where the mixture has the least density and where there is a comparatively high suction. This obviously imposes considerable resistance to the flow of mixture to the engine and materially reduces the quantity of charge obtainable by the motor at high speeds. A further disadvantage of this practice lies in the fact that the kinetic energy which is stored up in the whirling mass of mixture is lost by the practice of drawing the charge from the center of the vortex, this requiring the dissipation of the kinetic energy in the gas in order that it can be drawn inwardly to the central outlet port.

It is one of the fundamental objects of the present invention to provide a construction of fuel separator and vaporizer wherein the heavy ends and all unvolatilized particles of fuel are separated out of the main body of air or mixture and are subjected to the requisite vaporizing temperature without the objectionable heating of the air.

It is a further object to provide a construction wherein the supply of mixture to the engine will be drawn from the region of maximum density in the device and without loss of kinetic energy in the whirling body of mixture. This object is attained by drawing the mixture from the outer strata of the whirling mass, either through an outlet extending substantially tangentially in the direction of whirl, or, what is its equivalent, through a lateral outlet into which the high velocity mixture from the outer strata of the whirling volume is deflected. By this arrangement a mixture charge of maximum density is drawn into the engine cylinders, and the velocity and kinetic energy of the whirling body of gas is continued into the intake manifold to the cylinders, thereby reducing the resistance to air flow to the cylinder to a negligible quantity.

A further object of the present invention is to maintain an effective separating function by causing the liquids and gases to flow laterally away from each other in opposite directions along or relative to the walls of the whirling chamber, the liquids being preferably gravitated downwardly along this wall and the gases raised upwardly under the action of the engine suction. The mixture outlet from the whirling chamber is disposed in a plane which is elevated above the plane of the inlet so that there is minimum possibility of any of the unatomized or unvaporized particles of fuel reaching this outlet. The gravitational discharge of the fuel particles down along the chamber wall may be aided by the creation of a slight suction or circulation of a portion of the gases downwardly along this wall.

A further object of the invention is to combine with the above whirling chamber an improved construction of fuel segregating and vaporizing chamber. For the purposes of returning the gaseous products of the vaporized fuel particles from the segregating and vaporizing chamber to the mixture entering the engine, we contemplate creating a restricted circulation of a portion of the gases down into the segregating and vaporizing chamber for the purpose of picking up the vaporized combustible products, and then recirculating these gases up into the whirling volume of mixture discharging from the device. This fuel segregating and vaporizing chamber is thermally insulated against radiation of heat to the main body of air, thus preventing transfer of heat to the air either by conduction or radiation. Owing to the relatively low temperature at which the air is kept the vapor created in this vaporizing chamber, upon rejoining the air charge, is usually condensed into a fine fog in the intake manifold, which fog is so finely divided as to immediately vaporize again in the cylinders on the compression stroke.

The fuel segregating and vaporizing chamber functions to retain the heavy ends of the fuel in subjection to heat until they have become vaporized, and this, as previously pointed out, involves a delay in their passage to the engine cylinders. In this regard we have provided a preliminary heating surface which has unique cooperation with the fuel segregating and vaporizing chamber to the end of increasing the flexibility of the motor notwithstanding the delayed passage of fuel caused by the fuel segregating and vaporizing chamber. This preliminary heating surface is preferably in the nature of a hot spot positioned to receive the impinging particles of fuel as they enter the present device from the carbureter. This hot spot is preferably limited in area in order that it will vaporize only the more volatile particles of fuel, for the reason that if this hot spot were made sufficiently large to volatilize the heavy ends and all of the fuel particles, it would produce the undesirable heating of the air previously referred to. It will thus be seen that this preliminary hot spot and the segregating and vaporizing chamber cooperate by the action of the preliminary hot spot vaporizing the more volatile particles of fuel and the vaporizing chamber vaporizing the less volatile particles of fuel which must be retained in delayed contact with a heating surface. During periods of acceleration, particularly when the device is associated with a carbureter having an accelerating well or other temporary fuel enriching means, the quantity of these unvolatilized fuel particles is increased. The correlation between the preliminary hot spot and the vaporizing chamber increases the flexibility of the motor during these periods by virtue of the preliminary hot spot vaporizing the unvolatilized particles of this increased charge and maintaining the temporary richness of the mixture over the period of delay incident in the vaporizing action of the vaporizing chamber.

Other more specific objects and advantages will hereinafter appear. One general embodiment of the invention is illustrated in the accompanying drawings in which:

Figure 3 is a horizontal sectional view taken on the plane of the line 3—3 of Figure 2;

Figure 4 is a similar sectional view taken on the plane of the line 4—4 of Figure 2;

Figure 5:
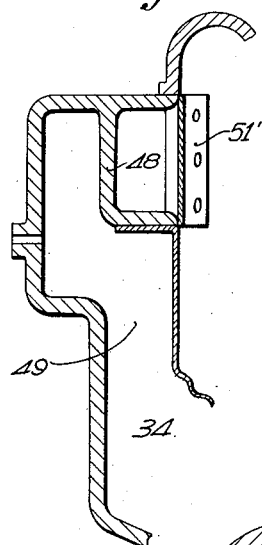
Figure 2:
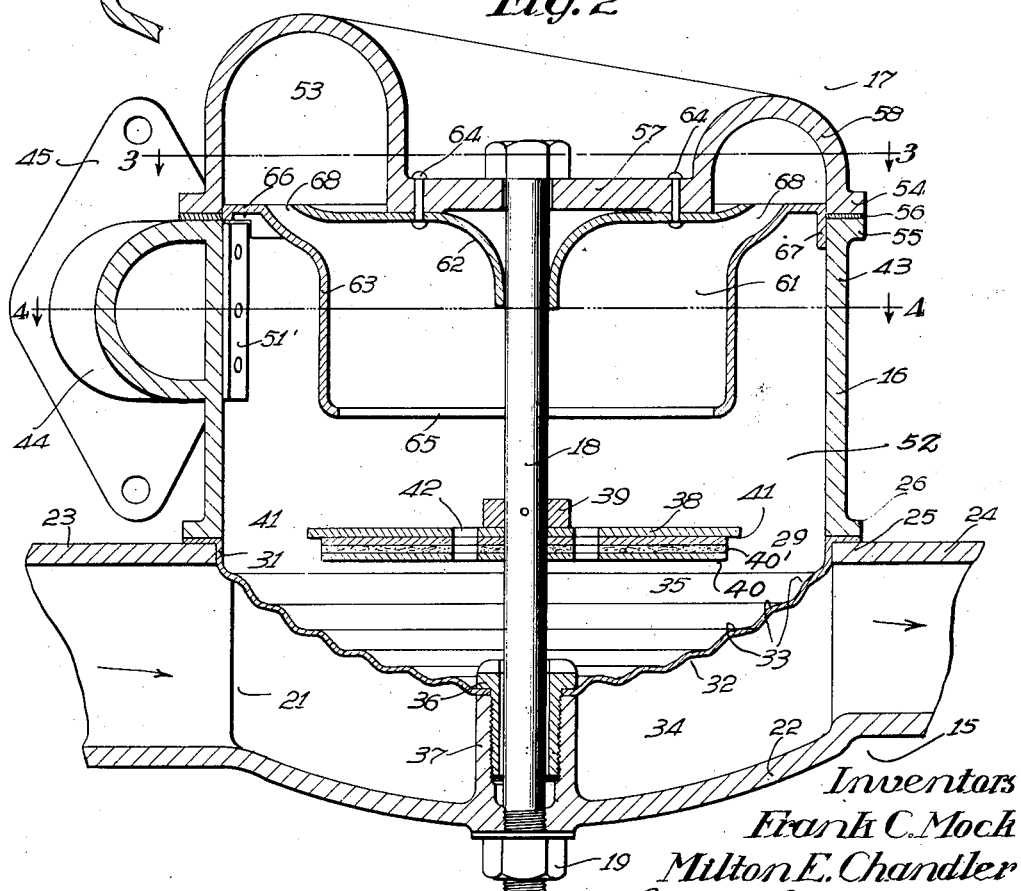
Figure 2 is an enlarged vertical sectional view through the fuel separator and volatilizer.
Figure 6:
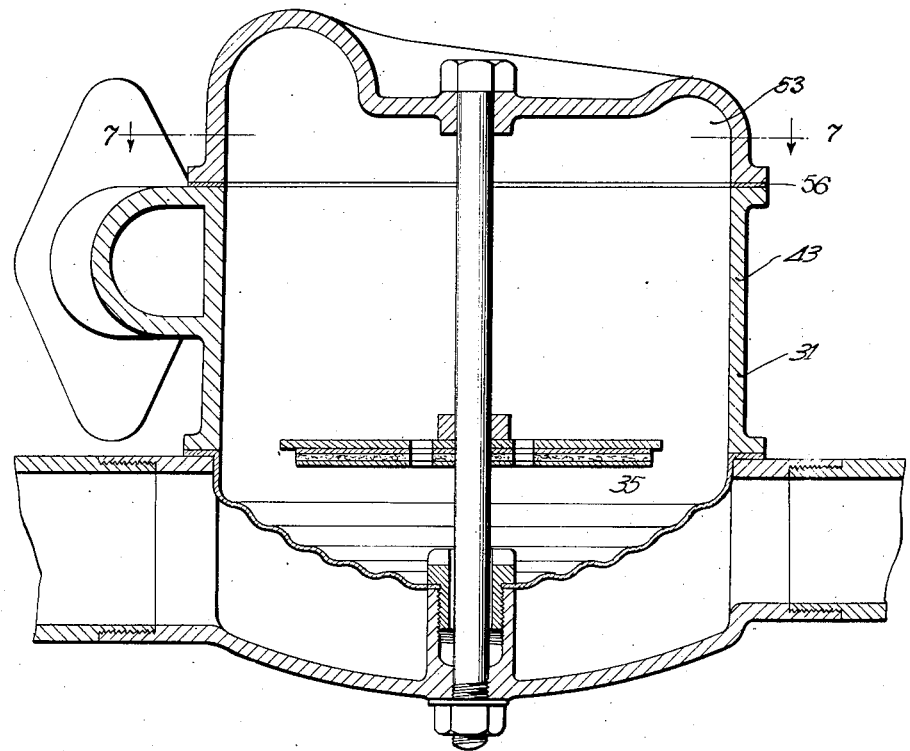
Figure 7:
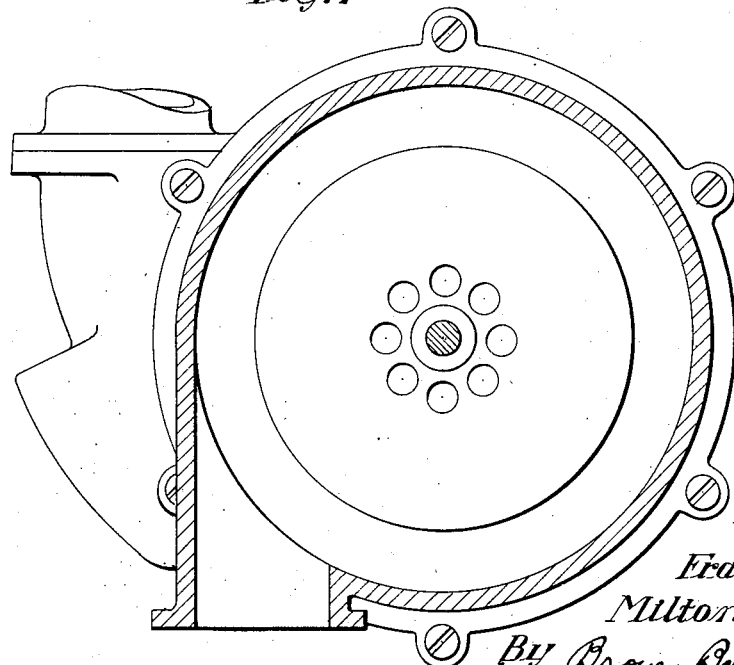
Figure 8:
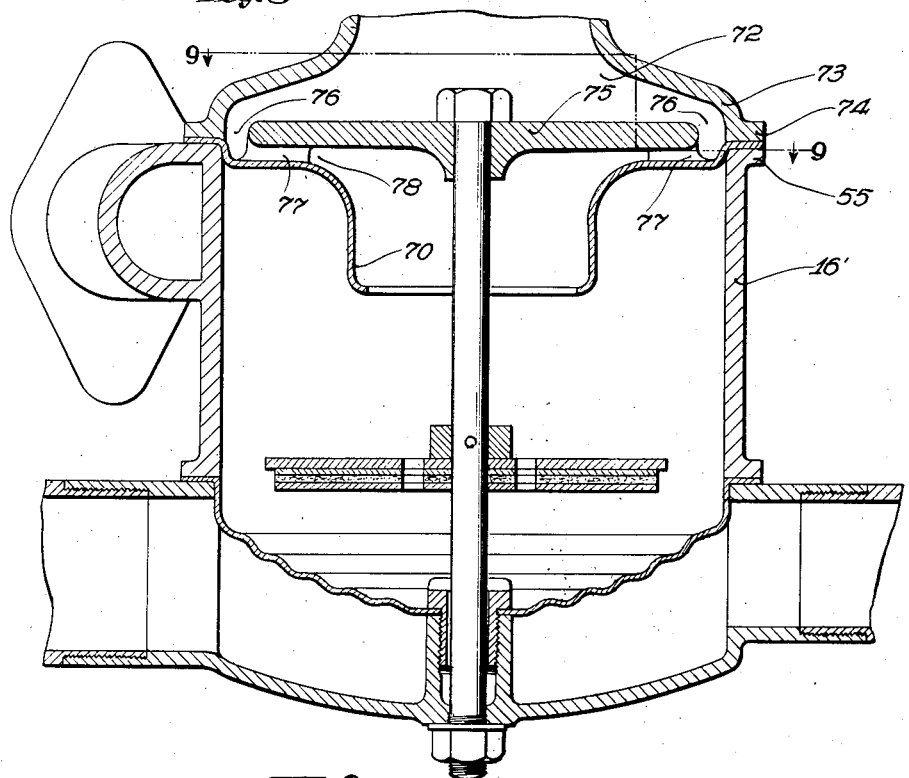
Figure 9:
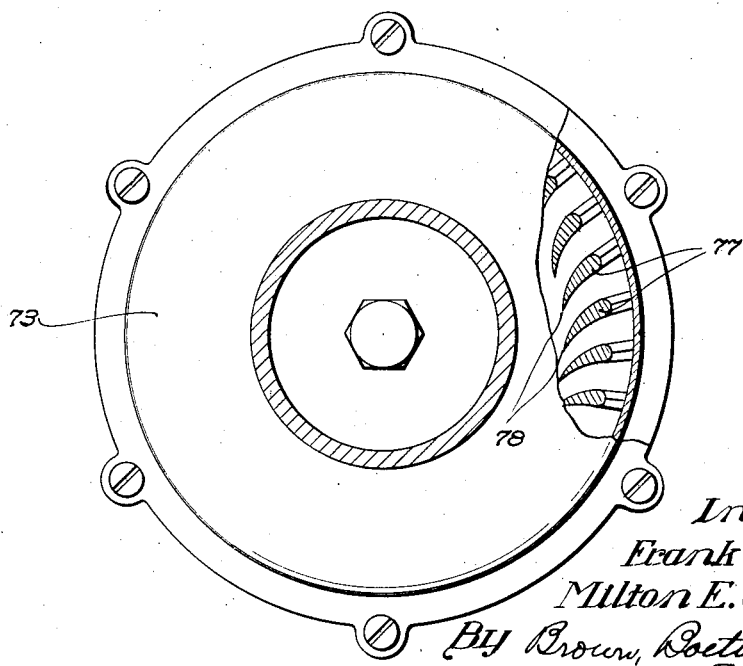

Figure 4ª is a fragmentary view illustrating the fuel guiding plate;

Figure 5 is a fragmentary vertical sectional view taken on the plane of the line 5—5 of Figure 4;

Figure 6 is a view similar to Figure 2, illustrating a modified form;

Figure 7 is a horizontal sectional view taken on the plane of the line 7—7 of Figure 6;

Figure 8 is a vertical sectional view of another modified form;

Figure 9 is a horizontal sectional view thereof taken on the plane of the line 9—9; and Figure 10 is a vertical sectional view of still another form of the device.

Figure 1:
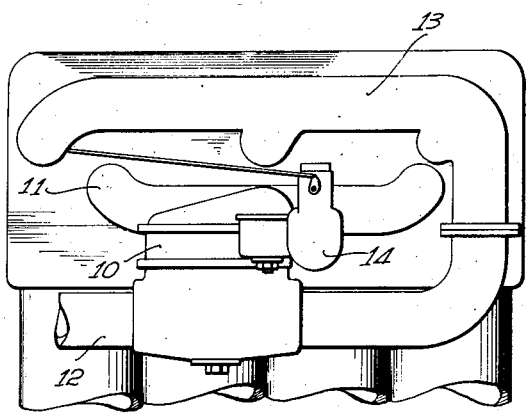
Figure 1 is a fragmentary elevational view of an internal combustion motor illustrating our device applied thereto.

Referring to Figure 1, the present fuel separating and volatilizing device, which is designated 10 in its entirety, is supported jointly by the intake manifold 11 and an exhaust conduit 12 receiving the exhaust gases from the exhaust manifold 13. A suitable design of carbureter 14 (preferably having a horizontal outlet) may be mounted on the device 10 to deliver mixture thereto. The outlet from the fuel separating and vaporizing device has direct connection with the intake manifold 11. The bottom portion of the device 10 has connection in the exhaust conduit 12 for the flow of exhaust gases therethrough in proximity to the vaporizing chamber, the connections for this exhaust circulation being arranged as indicated for the circulation of the entire volume of the exhaust gases; or being arranged in shunt of the exhaust conduit or in a similar relation thereto whereby the volume of exhaust gases flowing through the separating and vaporizing device can be readily controlled.

The combined fuel separating and volatilizing chamber is built up of lower, intermediate and upper horizontal sections 15, 16 and 17, respectively, which are connected together by a bolt 18 extending through the several sections and projecting from the bottom of the lower section 15 to receive a nut 19. The lower section 15 is constructed as a bowl shaped casting consisting of a cylindrical wall 21 and a curved bottom 22. This casting is formed with diametrically opposite inlet and outlet connections 23 and 24 for connection in the exhaust conduit 12; the sectional view of Figure 2 looking at the device from the opposite side from that viewed in Fig. 1, which accounts for the apparently reversed circulation of the exhaust gases through the connections 23 and 24. The upper edge of the wall 21 is formed with a peripheral flange 25 adapted to cooperate with a similar flange 26 on the lower edge of the intermediate section 16, ears 28 on these flanges being adapted to receive cap screws or bolts for joining the two sections together. Clamped between the opposing flanges 25 and 26 is the marginal flange 29 of a cylindrical sheet metal shell 31, preferably constructed of brass or copper. The curved bottom 32 of this shell, which is formed with concentric corrugations 33 for increasing the effective heating area thereof, constitutes the top of the circular exhaust gas chamber 34 and the bottom of the circular fuel vaporizing chamber 35. The center of the corrugated bottom 32 is apertured to receive the tubular clamping nut 36 which threads down into a boss 37 and closes the bottom of this sheet metal shell against leakage around the tie bolt 18. It will be noted that this mounting of the shell 31 permits of its convenient removal for cleaning or substitution. In addition to increasing the effective heating area of the vaporizing chamber 35, the corrugations 33 constitute a series of separate pockets for receiving and distributing the entrained particle of fuel uniformly over the entire heating surface, it being noted that the relatively thin section of this heating surface will result in the quick and intense heating of the fuel accumulating thereon. The top of the vaporizing chamber 35 is defined by a circular disk 38 which is mounted on the tie bolt 18 through a hub 39 pinned thereto. The edge of the disk 38 is spaced from the interior wall of the shell 31 to provide the annular opening 41, and adjacent its center this disk is provided with a plurality of openings 42, for a purpose which we shall presently describe. This disk or shield is preferably constructed of successive laminations of metal 40 and asbestos or other heating insulating material 40' for minimizing the amount of heat radiated up into the separating chamber.

The intermediate casing section 16 consists of a cylindrical wall 43 formed at one side with a tangential or involute intake passageway 44. This intake passageway is flanged as indicated at 45 to receive the conventional flange 46 on the mixture outlet of the carbureter. The intake passageway 44 may, if desired, be formed with a constricted discharge opening 47 for accelerating the velocity of the mixture as it enters the device. A relatively small hot spot 48 is formed on the outer wall of the inlet passageway 44 in proximity to the discharge opening 47, in proper position for receiving the impinging particles of unatomized fuel entering the inlet passageway from the carbureter. Where the constricted outlet 47 is formed in this passageway, the mixture, and particularly the heavier fuel particles, are crowded over against the hot spot 48 for vaporization of these fuel particles. The spot 48 is heated by a branch conduit 49, which, as shown in Fig. 5, extends upwardly from the exhaust gas chamber 34.

During certain operating conditions there is a tendency for a considerable quantity of the fuel to enter the inlet passageway 44 in liquid condition, which fuel enters the separating chamber 52 by running along the walls of the inlet passageway and discharging from the edges or shoulders 50 at the intersection of the inlet passageway and separating chamber. The globules of liquid fuel have a tendency to "tear" or whip off these shoulders into the air stream, particularly from the upper or inclined shoulders from which a drip action can occur. This action is undesirable for there is the possibility of these large globules of fuel being drawn into the engine by the air stream. Accordingly, we have provided an inclined lip 51 (Figure 4a) which extends diagonally down from the highest point of the throat outlet 47 into coincidence with the circular wall of the separating chamber in order to guide the stream of liquid fuel down upon the walls of the chamber without allowing it to be whipped off into the air stream. This diagonal lip may be cast integral at the throat outlet 47 or it may constitute part of a plate 51' which is suitably fastened to the circular wall of the separating chamber as shown. This guiding lip is preferably arranged to form a channel directly in its rear to receive and guide onto the walls of the separating chamber any stream of fuel flowing along the inner or bottom walls of the inlet passageway 44.

The upper part 53 of the whirling chamber is defined in the upper casing section 17 which is flanged as indicated at 54 to be secured to the upper flange 55 on the intermediate casing section 16, these two flanges being provided with matching lugs 28 for the reception of cap screws or the like, and having an interposed gasket 56 for sealing the joint. This upper casing section consists of a central web 57 and a peripheral channel portion 58 of inverted U-shaped cross section which is open at the bottom and which rises in vertical dimension as it progresses towards the tangential mixture outlet 59. The upper and lower portions 53 and 52 of the whirling chamber are connected through an annular passageway 61 defined between inner and outer sheet metal shells 62 and 63. The inner shell 62 is secured by rivets 64 to the casing web 57 and is tapered inwardly at its center to snugly embrace the tie-bolt 18. The outer shell 63 has a central inlet opening 65 at its lower end, and at its upper end is formed with a horizontal flange 66, forming part of the floor of the chamber portion 53, and is also formed with a vertical flange 67 by which the shell is suitably secured to the casing 16—17. The outer edge of the shell 62 is spaced from the flanged portion 66 to form the curved outlet 68 which is tapered similarly to a venturi configuration and which opens into the bottom of the chamber portion 53 throughout substantially the entire circumference of the chamber. The channeled chamber portion 53 increases in width as well as in height progressively towards the mixture outlet 69 so that the resulting chamber or passageway is of tapering form rising in a helical curve towards the tangential mixture outlet 59. This outlet is flanged as indicated at 69 for connecting with the conventional manifold flange.

As the mixture enters the device through the intake passageway 44 the inertia of the heavier, unatomized particles of fuel results in their impingement against the hot spot 48, so that these fuel particles will be subjected to a brief vaporizing action immediately upon egress from the carbureter, but without involving undue heating of the air. The lighter, more volatile particles of fuel are vaporized on this hot spot and pass off into the mixture for immediate conveyance to the engine cylinders, while the heavier ends pass into the separating chamber 52—53 where they are separated out on the walls of the chamber for precipitation into the fuel segregating and vaporizing chamber 35. The carbureter 14 will be presumed to have an accelerating well or some other equivalent fuel enriching device for acceleration, and it should be noted that during this period the quantity of unvolatilized fuel is increased with the increased richness of mixture. At this time it is desirable that the increased richness of mixture or a considerable proportion thereof be immediately conveyed to the engine to obtain the desired responsiveness and it will be noted that to this end the hot spot 48 immediately vaporizes a considerable proportion of the unvolatilized particles of the increased charge for direct conveyance in the mixture stream. This hot spot also tends to prevent the drop in temperature which usually occurs with the sudden discharge of the contents of the accelerating well into the mixture stream.

The mixture entering the whirling chamber tangentially produces a high velocity vortex motion which throws the heavier fuel particles out into contact with the walls 43, from whence the accumulation of fuel drains downwardly into the vaporizing chamber 35. The air with its volatilized fuel is then drawn inwardly to the opening 65, the mixture still retaining its whirling or involute motion. This motion continues up through the annular passageway 61 and into the chamber area 53, from whence the whirling mixture is drawn off tangentially through the outlet passageway 59. The upper chamber area 53 is illustrated as being of the same diameter as the lower chamber area 52 for compactness of form and simplicity of construction, although it is to be understood that this upper chamber area may be extended to a greater diameter if desired for increasing the centrifugal effect therein. This also applies to the other forms to be later described. In the construction illustrated the contraction of the whirling vortex occuring in the annular passageway 61 constitutes a balanced point in the contained body of mixture for the reason that the outwardly expanding centrifugal force occuring above this passageway substantially balances the retarding effect tending to restrain the inward contraction of the vortex below the passageway. As above intimated, however, by proportioning the respective diameters of the upper and lower chamber areas 53 and 52 different effects may be obtained. The kinetic energy created in the whirling volume of mixture is retained up into the upper chamber area 53 and out into the intake manifold by reason of the tangential arrangement of the outlet passageway 59, and obviously this outlet draws mixture from a point of maximum density in the device. The ascension of the mixture into the intermediate passageway 61 creates an upward draft through the openings 42 and the expansion of the mixture along the walls 43 produces a limited downward circulation of mixture into the vaporizing chamber. These together create a circulation of a limited volume of the mixture down through the annular opening 41 and through the vaporizing chamber 35 and upwardly through the openings 42, to join the ascending body of mixture. The annular film of mixture circulating downwardly through the opening 41 stimulates the descent of the particles of liquid fuel on the walls 43 and 31 into the vaporizing chamber 35, and this limited volume of mixture in flowing through the chamber 35 and up through the holes 42 picks up the gasified fuel created in the vaporizing chamber and unites the same with the main volume of mixture ascending through the passageway 61.

As an alternative construction, the intermediate passageway 61 with its openings 65 and 68 may be eliminated as shown in Figures 6 and 7. In this arrangement, the outer strata of mixture remains in contact with the outer walls of the whirling chamber and rises into the helical portion 53 without undergoing any contraction of the vortex. The tangential outlet 59 receives the outer strata of mixture of maximum density directly from the chamber portion 53, and, as before, the kinetic energy created in the vortex of mixture is retained into the intake manifold. As in the previous embodiment, the volatilized constituents of the mixture are separated from the heavier particles of fuel by a lateral separation occuring on the walls 43, the volatilized fuel ascending with the air up into the chamber portion 53 and the heavier fuel particles descending under a gravitational discharge down into the vaporizing chamber 35.

As shown in Figures 8 and 9, a tangential discharge of the mixture may be obtained by deflecting the mixture out of the chamber by vanes or the like, which project into a region of maximum density and avoid loss of kinetic energy. As shown in the latter form, the outlet discharge occurs through an outlet conduit 72. This discharge conduit is flared outwardly at its lower end as indicated at 73, where it is formed with a flange 74, adapted for bolting to the upper flange 55 of the intermediate casing section. A circular plate or disk 75 is spaced from the bell shaped portion 73 to provide an annular passageway 76 therebetween, this plate having a plurality of vanes 77 formed around its circumference on the under side thereof. A shell 70 contracts the vortex of mixture and guides the same outwardly into the vanes 77, the shell 70 closely fitting the bottoms of the vanes. As shown in Figure 9, the leading edges 78 of these vanes extend forwardly against the motion of the mixture so as to throw the intercepted mixture outwardly into the plane of the annular passageway 76. If desired the outer ends of these vanes may also be scooped with their lower edges extending forwardly so as to throw the mixture upwardly through the annular passageway 76 under its own kinetic energy. In the operation of this embodiment the separation of the unvolatilized particles is effected as before described, and thereafter the whirling mixture upon encountering the vanes 77 is thrown outwardly and upwardly with sufficient inertia to discharge the mixture through the passageway 76 without loss of density of kinetic energy.

In the modified form shown in Figure 10 the mixture flowing into the separating chamber through the tangential inlet 44, past the hot spot 48, enters a helical channel 80 which spirals downwardly from the inlet passageway, as indicated in dotted lines. The inner side of this channel area 80 is defined by a cylindrical shell 81 which is flanged at 82 for support between the flanges 83—83' on the casing sections 84 and 85. The lower edge of the shell 81 is preferably formed with an outward slope 86 which serves to deflect the liquid fuel accumulating on the shell down into the vaporizing chamber 35 in a particular manner which we shall presently describe.

As we previously emphasized, it is very desirable to avoid undue heating of the air, but at the same time a high temperature in the vaporizing chamber is essential to the effective vaporization of the heavy ends of the fuel. The relatively thin, sheet metal bottom 32' of the vaporizing chamber may attain a luminous temperature with consequent rapid heat transfer by radiation and conduction. As before described, the shield or disk 38' of asbestos and metal minimizes the radiation of heat to the main body of air. The walls of the separating chamber tend to become quite hot by direct heat conduction from the vaporizing surface 32'. To minimize the heating of the air resulting from contact with these walls there is provided a sheet metal shell 87 in immediate spaced relation to the outer walls of the channel area, this shell maintaining a film of air or mixture between the walls of the channel and the shell. The mixture enters through aligned openings in the channel wall and in the shell, the opening in the shell being indicated at 88, and thence revolves around in contact with the inner wall of the shell 87 to avoid contact with the walls of the casing section 84. The shell 87 is suspended by an upper flange 89 which is suitably secured to the upper wall of the channel 80, the lower edge of the shell projecting down below the lowest point to which the main body of air descends and hanging free to prevent heat conduction thereto.

Due to the turbulence of varying air currents existing in the mixture stream there are occasioned splashing drops which do not follow the law of centrifugal action but get on the inner side rather than on the outer side of the mixture passages and tend thence to be carried up to the motor. We have found that in addition to the use of centrifugal force it is necessary to provide means whereby these drops will be drawn off or led off into the vaporizing chamber, similarly to the action of the inclined lip 51, and the idea and manner of drawing off these extra drops is quite an important part of the invention. Many variations in construction are possible but they all comprehend the use of an edge, wire, surface, groove or equivalent arrangement for guiding these drops into the vaporizing chamber. In Figure 10 there is shown the use of spirally inclined wires 90 secured to the slope 86 for guiding the drops into the vaporizing chamber.

The corrugated bottom 32' of the vaporizing chamber is depressed centrally as indicated at 92 to counteract the tendency of the liquid fuel to pyramid at this point. The mixture whirling upwardly through the cylindrical shell 81 expands outwardly into the upper chamber area 93 which is of substantially the same radius as the lower channel area 80. From this point the vortex of mixture is discharged through the usual tangential outlet 59 previously described.

It will be obvious that various changes may be made in the general embodiment hereinbefore described without departing from the essence of the invention, as set forth in the appended claims.

We claim:

1. A fuel separator and vaporizer comprising a chamber, a substantially tangential inlet passageway opening into said chamber and imparting a whirling motion to the mixture therein, an outlet passageway leading from said chamber above said inlet passageway, a fuel vaporizing surface in the end of said chamber below said inlet passageway, means for heating said surface, and a baffle member comprising heat insulating material interposed between the whirling volume of mixture and said vaporizing surface, said baffle permitting the precipitation of fuel particles to said vaporizing surface along the walls of said chamber, the separated fuel collecting on said vaporizing surface being trapped against return to the mixture stream except by vaporization.

2. A separator and vaporizer having a separating chamber separating large fuel particles out of the mixture stream by causing a change in direction of flow of said mixture stream, a vaporizing chamber, the separated fuel particles having a gravitational discharge from said separating chamber down into said vaporizing chamber, said vaporizing chamber being removed from the path of the main body of mixture stream and being closed to trap fuel therein against return to the mixture stream except by vaporization, means for heating a portion of said vaporizing chamber, and means for insulating the main body of the mixture stream from the radiant heat from said heated portion.

3. A separator and vaporizer comprising a housing having a horizontally extending intake and a horizontally extending outlet, a separating chamber in said housing arranged to produce a change in the direction of flow of the main body of the mixture entering through said inlet, a vaporizing chamber in said housing below said separating chamber to receive the separated fuel particles by gravitational discharge, said vaporizing chamber being removed from the path of the main body of mixture stream, an exhaust chamber for heating the bottom of said vaporizing chamber to return the separated fuel back to the mixture stream in vapor form, and heat insulating means for preventing the transmission of heat from the heated portion of said vaporizing chamber to the main body of the mixture stream.

4. A separator and vaporizer comprising a mixture passageway adapted for circulating the mixture for an internal combustion engine, a fuel separating chamber constituting part of said passageway, a vaporizing surface for vaporizing the fuel particles separated out of the mixture in said chamber, said vaporizing surface trapping the separated fuel against return to the mixture stream except by vaporization, and a heat insulating baffle for preventing the main volume of mixture from contacting with said vaporizing surface.

5. A fuel vaporizer comprising a chamber having a substantially horizontal inlet and having an outlet, a spiral channel connected to said inlet, a heated bottom plate in said chamber, said channel directing the heavier fuel particles onto said plate, a heat insulating baffle above said bottom plate, said outlet being axial to the channel, and said baffle being concentric with the outlet for preventing the mixture from contacting with said hot plate, but permitting the fuel to rise from the hot plate and join the mixture.

6. A fuel vaporizer comprising a chamber having a mixture inlet and an outlet, a peripheral channel in said chamber communicating with said inlet, a heated bottom plate in the chamber, said peripheral channel directing the fuel particles onto said plate, a heat insulating baffle for preventing the mixture from reaching said plate, said outlet being concentric with said chamber for receiving the mixture after the fuel is discharged from below said baffle, and said outlet being tangential through said peripheral channel.

7. A vaporizer for an internal combustion engine comprising a chamber having a heated bottom surface, means for whirling the mixture in said chamber to create a vortex and to throw the heavier particles of fuel therein against the side walls of said chamber, the fuel adhearing to said side walls and gravitating to said heated surface for vaporization thereon, a heat insulating baffle above said heated surface preventing the mixture from coming in contact with said surface, and said baffle having an opening therein permitting the vapor produced on said surface to rise and rejoin the mixture at the vortex of the whirl.

8. In a separator and vaporizer, the combination of a separating chamber arranged to produce a change in the direction of flow of a fuel mixture stream, a vaporizing pan closing the lower end of said chamber, means for heating said pan, the fuel particles thrown from the mixture flowing down the chamber walls to said pan to be vaporized, a heat insulating baffle member separating said chamber from said pan except for a narrow annular gap between the chamber wall and the baffle member periphery whereby the mixture in said chamber will be heat insulated from said pan, means permitting the vaporized fuel from returning from the pan into the mixture stream, and an outlet from said chamber for the mixture.

In witness whereof we hereunto subscribe our names this 21st day of October, 1921.

FRANK C. MOCK.
MILTON E. CHANDLER.